United States Patent Office 2,906,675
Patented Sept. 29, 1959

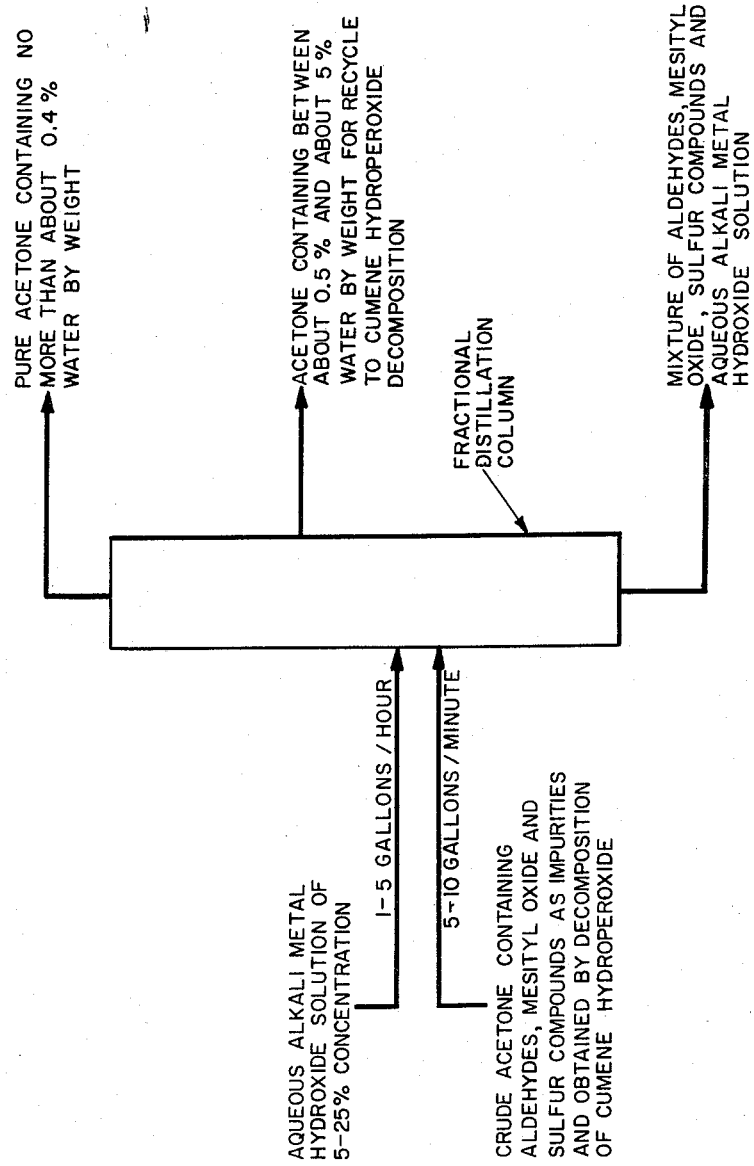

2,906,675

RECOVERY OF PURE ACETONE

Ronald H. Hall, Mount Royal, Quebec, Canada, and Ernest Turk, Newark, Del., assignors to Hercules Powder Company, Wilmington, Del., a corporation of Delaware Application January 27, 1956, Serial No. 561,929

7 Claims. (Cl. 202—57)

This invention relates to the acid catalyzed decomposition of cumene hydroperoxide to phenol and acetone and to the recovery of the products resulting from the decomposition reaction. More particularly, the invention relates to the recovery of pure acetone by distillation of the crude acetone resulting from decomposition of cumene hydroperoxide. The invention also is particularly concerned with recycle to the decomposition reaction of acetone containing up to 5% water.

A process has recently been developed which yields acetone and phenol as products and which involves the decomposition of cumene hydroperoxide ($\alpha,\alpha$-dimethylbenzyl hydroperoxide) in the presence of acidic substances to form substantially equimolecular amounts of phenol and acetone. The crude acetone obtained by distillation of the decomposition products contains several impurities and is inadequate to meet the very rigorous specification imposed on commercial acetone. As set forth in ASTM Designation D-329-33, the maximum permissible water content is low, being equivalent to about 0.4% by weight. The same ASTM specification for acetone requires that the color of potassium permanganate added to the acetone be retained for a minimum period of 30 minutes. The color retention test is made by adding 1 ml. of 0.1% by weight of $KMnO_4$ to 100 ml. of the acetone sample and allowing the mixture to stand at 25° C. in the dark. With respect to many commercial uses of acetone, it is desirable that the color retention time in the permanganate test be in excess of 4 hours.

The failure in the permanganate test of the acetone obtained by distillation of cumene hydroperoxide decomposition products has been attributed to aldehydic impurities. It has now been found that in addition to the aldehydic impurities the crude acetone obtained from decomposition of cumene hydroperoxide also contains mesityl oxide and that this latter compound contributes markedly to failure of the acetone in the permanganate test. It has additionally been found that the crude acetone contains sulfur compounds, probably mercaptans, which give to the acetone a bad odor and make it undesirable for certain uses.

In accordance with this invention it has been found that the aldehydic impurities, mesityl oxide and the sulfur compounds all may be removed from the crude acetone obtained by decomposition of cumene hydroperoxide by distilling the crude acetone under such conditions that the various impurities either are retained in the distillation column or are converted into materials which are less volatile than acetone. The process of this invention involves the introduction of the crude acetone continuously into a fractional distillation column at an intermediate point in said column, continuously adding to the column at a point substantially below the top of the column, but above the acetone feed point, an aqueous solution of an alkali metal hydroxide selected from the group consisting of sodium hydroxide and potassium hydroxide, the concentration thereof in the solution being between about 1 and about 25%, and removing pure acetone as overhead from the column. The process also includes the removal of acetone containing up to about 5% water by weight at a point in the column which is below the point of removal of the pure acetone overhead but which is above the point of introduction of the aqueous sodium hydroxide or potassium hydroxide solution.

The process of this invention is illustrated by the following example wherein all parts are on a weight basis unless otherwise specified.

Example

The cumene hydroperoxide feed used in this example was prepared by oxidizing cumene with air to obtain an oxidate containing approximately 25% cumene hydroperoxide. This oxidate then was subjected to distillation to remove substantially all of the unreacted cumene. The hydroperoxide concentrate so formed contained about 90% hydroperoxide and the remaining components were $\alpha,\alpha$-dimethylbenzyl alcohol, acetophenone and a small amount of cumene.

The concentrated cumene hydroperoxide feed was decomposed by adding it to a reaction medium composed of acetone and concentrated sulfuric acid. The amount of acid based on the acetone was about 1% by weight. The acetone had a water content between about 0.5 and 5% by weight. The decomposition reaction was carried out continuously with introduction of the hydroperoxide, acetone and acid into the reactor and withdrawal from the reactor of decomposition products after the reaction had reached a steady state. The decomposition reaction mixture in the reactor was cooled by vaporization of acetone, the acetone vapors passing from the reactor to a condenser where the vapors were condensed and then returned to the reactor.

The decomposition reaction products which were withdrawn from the reactor were then washed with sodium phenate to neutralize the sulfuric acid contained in the reaction mixture and the sodium sulfate formed by the neutralization was separated. The neutralized decomposition products then were subjected to distillation to remove as an overhead fraction crude acetone. The bottoms fraction containing the phenol and other products was subjected to a series of distillations for the purpose of recovering pure phenol.

The crude acetone fraction obtained above was first subjected to a stripping operation for the purpose of removing as many aldehydic impurities as possible. The stripped product then was introduced into a fractionating column containing 55 trays. The crude acetone was introduced at the thirty-eighth tray from the top of the column at a rate of about 8 gallons per minute. Simultaneously there was added at the thiry-fourth tray from the top of the column aqueous 10% sodium hydroxide at a rate of about 3 gallons per hour. After steady conditions had been attained, pure acetone was taken from the top of the column at a rate of about 3 gallons per minute and at the twentieth tray from the top of the column recycle acetone likewise was taken off at a rate of about 3 gallons per minute.

The pure acetone taken from the top of the column had a water content which was below about 0.4% by weight and had a permanganate retention period of 4 hours or more. The recycle acetone taken from the twentieth tray from the top of the column had a water content which was below 5% by weight, the value in this particular run being approximately 1.2% by weight. This recycle acetone was returned to the decomposition reactor and was introduced therein as makeup acetone.

When the above operating conditions were duplicated, except for omission of the introduction of the aqueous sodium hydroxide solution to the acetone fractional distillation column, the product acetone obtained was poor in odor and failed to pass the permanganate specification.

The process as described above is most advantageous in that a pure acetone product may be obtained. Not only are aldehydic and sulfur-containing impurities removed, it also is possible through operation of the described process to prevent mesityl oxide from being found in the acetone product. The water introduced with the aqueous solution of sodium hydroxide or potassium hydroxide forms an azeotrope with mesityl oxide which is higher boiling than acetone and proper operation of the column permits recovery of acetone free from mesityl oxide. In addition, the alkali in the aqueous hydroxide solution neutralizes volatile acids which tend to catalyze self-condensation of the acetone. The mechanism whereby the aldehydic and sulfur-containing impurities are removed is not completely understood. Some of the sulfur compounds may be mercaptans which form involatile salts with sodium hydroxide and potassium hydroxide. The aldehydic impurities may condense or react in such a manner that other involatile products are produced. In any event a major problem confronting operation of the process of producing phenol and acetone from cumene hydroperoxide has been overcome.

The pure acetone product withdrawn from the top of the acetone column has a permanganate color retention period of 4 hours or more and a water content of about 0.3% by weight. To obtain pure acetone of these qualifications the column is operated at a reflux ratio of about 5:1 or higher at the top of the column. The recycle acetone has a lower permanganate color retention period than does the overhead pure acetone and the water content will be between about 1 and about 5%. Since the reflux ratio below the point of withdrawal of the recycle acetone is about 2:1, it is apparent that less heat is required than in a process where purified acetone is the only product recovered and part is used for recycle to the decomposition reactor.

The withdrawal of recycle acetone containing between about 1 and about 5% water is additionally most advantageous in that use of this acetone by recycle to the decomposition reactor hinders mesityl oxide formation at that point in the process. It has been found that a small amount of water in the acetone diluent used during the decomposition reaction inhibits the formation of mesityl oxide. Amounts of water between about 1 and about 5% based on the acetone are advantageous. However, this amount of water does not provide sufficient water based on the total decomposition reaction mixture to hinder the decomposition reaction or lower the yield of phenol. The amount of acid catalyst necessary to effect the decomposition reaction is maintained at a desirable minimum.

Although the example has shown the use of aqueous sodium hydroxide solution, aqueous solutions of potassium hydroxide also are operable. The concentration of these solutions may be between about 1 and about 25% sodium hydroxide or potassium hydroxide. A more desirable concentration range is between about 5 and about 25%, and the preferred concentration is between about 10 and about 25%. The aqueous hydroxide solutions are added to the acetone fractional distillation column at a rate varying between 5 gallons per hour to 1 gallon per hour for crude acetone feed rates which are in the range of about 5 to about 10 gallons per minute. The rate of addition of the aqueous hydroxide solutions depends upon their concentration. For example, a 5% aqueous sodium hydroxide solution is desirably added at a rate of about 5 gallons per hour whereas a 25% sodium hydroxide solution is preferably added at a rate of about 1 gallon per hour.

The use of aqueous sodium hydroxide or aqueous potassium hydroxide in accordance with the process of this invention, in addition to improving the permanganate time of the recovered acetone and the odor of the acetone, also neutralizes the minor amount of acids existing in the column thereby eliminating the corrosion of mild steel. These advantages plus that pertaining to reduction of mesityl oxide formation through use of recycle acetone containing between about 1 and about 5% water constitute a marked advance in the art and provide a more economical process for converting cumene hydroperoxide to phenol and acetone.

What we claim and desire to protect by Letters Patent is:

1. The process for the purification of the crude acetone obtained by the decomposition of cumene hydroperoxide which comprises fractionally distilling said acetone by continuously introducing it at a rate in the range of about 5 to about 10 gallons per minute into a fractional distillation column at an intermediate point in said column, continuously adding to said column at a point substantially below the top of the column but above the acetone feed point an aqueous solution of about 5 to about 25% concentration of an alkali metal hydroxide selected from the group consisting of sodium hydroxide and potassium hydroxide, the aqueous hydroxide solution being added at a rate varying between about 5 gallons per hour when the concentration is about 5% and about 1 gallon per hour when the concentration is about 25%, and removing pure acetone as overhead from said column.

2. The process of claim 1 wherein the concentration of the alkali metal hydroxide is between about 10 and about 25%.

3. The process of claim 1 wherein the alkali metal hydroxide is sodium hydroxide.

4. The process of claim 1 wherein the alkali metal hydroxide is potassium hydroxide.

5. The process of claim 1 wherein part of the distilled acetone is removed as an overhead of pure acetone and part is removed as a side stream at a lower point in the column but above the aqueous alkali metal hydroxide solution feed point as acetone having a water content higher than that of the pure acetone overhead but below about 5% by weight.

6. The process of claim 5 wherein the water content of the pure acetone overhead is below about 0.4% by weight and that of the side stream acetone is between about 0.5 and about 5% by weight.

7. The process of claim 5 wherein the side stream acetone is returned as recycle material to the decomposition reactor in which cumene hydroperoxide is decomposed in an acetone diluent.

References Cited in the file of this patent
UNITED STATES PATENTS

| | | |
|---|---|---|
| 2,575,244 | Carlson et al. | Nov. 13, 1951 |
| 2,624,699 | Joris | Jan. 6, 1953 |
| 2,734,085 | Adams et al. | Feb. 7, 1956 |
| 2,757,209 | Joris | July 31, 1956 |

UNITED STATES PATENT OFFICE

CERTIFICATE OF CORRECTION

Patent No. 2,906,675                                        September 29, 1959

Ronald H. Hall et al.

It is hereby certified that error appears in the printed specification of the above numbered patent requiring correction and that the said Letters Patent should read as corrected below.

Column 2, line 8, after "illustrated" insert -- by the drawing and --; column 4, lines 22 and 23, after "hydroperoxide" insert -- and containing aldehydes, mesityl oxide and sulfur compounds as impurities --.

Signed and sealed this 29th day of March 1959.

(SEAL)
Attest:

KARL H. AXLINE
Attesting Officer

ROBERT C. WATSON
Commissioner of Patents